(12) United States Patent
Hunter

(10) Patent No.: US 6,382,025 B1
(45) Date of Patent: May 7, 2002

(54) ROTATIONAL RATE SENSOR

(75) Inventor: Steven L. Hunter, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/419,033

(22) Filed: Oct. 15, 1999

(51) Int. Cl.[7] ............................................. G01P 15/00
(52) U.S. Cl. ................................. 73/514.03; 73/514.09
(58) Field of Search ........................... 73/514.03, 514.05, 73/514.09, 504.05, 514.33, 521; 33/366.15, 366.21; 200/61.45, 61.47, 61.52

(56) References Cited

U.S. PATENT DOCUMENTS

| 3,604,275 A | 9/1971 | Fox et al. ................. 75/5.4 |
| 3,823,486 A | 7/1974 | Bhat et al. ................. 33/366 |
| 3,946,494 A | 3/1976 | Wells ..................... 33/366 |
| 3,992,951 A | 11/1976 | Erspamer et al. ........... 73/497 |
| 4,503,622 A | 3/1985 | Swartz et al. .............. 33/366 |
| 5,852,878 A | 12/1998 | Seipp, Jr. et al. ........... 33/366 |

FOREIGN PATENT DOCUMENTS

| DE | 19717580 A | 4/1997 |
| GB | RD344029 A | 12/1992 |
| SU | 926525 B | 5/1982 |

*Primary Examiner*—Richard A. Moller
(74) *Attorney, Agent, or Firm*—Alan H. Thompson

(57) ABSTRACT

A rate sensor for angular/rotational acceleration includes a housing defining a fluid cavity essentially completely filled with an electrolyte fluid. Within the housing, such as a toroid, ions in the fluid are swept during movement from an excitation electrode toward one of two output electrodes to provide a signal for directional rotation. One or more ground electrodes within the housing serve to neutralize ions, thus preventing any effect at the other output electrode.

27 Claims, 2 Drawing Sheets

ROTATIONAL RATE SENSOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to accelerometers and more particularly to rotational rate sensors.

2. Description of Related Art

Electrolytic tilt or rate sensors are known in the art. Electrolytic tilt sensors include devices that change their electrical properties as a result of the interface of the electrolyte with electrodes contained therein when tilted or moved. For example, known electrolytic tilt sensors may provide an output voltage proportional to the tilt angle, a phase indication of tilt direction and an acceleration associated with the tilt when the sensor is configured as part of an appropriate electrical circuit. In such an example, the output voltage derives from the impedance associated with the electrolyte (also referred to as the electrolytic fluid or solution) of the sensor, which is a function of the tilt of the electrolyte due to gravitational or other forces.

One of the difficulties in fabricating an inexpensive angular rate or rotation rate sensors is producing a device that is insensitive to the constant acceleration of gravity. The majority of rate sensors are either tuning fork-type devices sensing a relatively weak force (i.e., Coriolis effect) and thus not very sensitive, or gyroscopes (either rotating or fiber optic-based) that are large, consuming lots of power and are expensive.

SUMMARY OF THE INVENTION

Briefly, the invention includes a novel rate sensing device, more particularly, a toroid accelerometer. The accelerometer includes a housing having a fluid cavity completely or essentially completely filled with an electrolytic fluid (e.g., liquid). Within the housing and electrolytic fluid is disposed at least one excitation electrode and at least one ground electrode as well as at least one output electrode. Ordinarily the output electrode(s) are connected (exterior to the cavity) to a differential amplifier which is connected (also exteriorly) to a synchronous demodulator.

During operation, the accelerometer is fixedly mounted to an object of rate measure so that (upon movement of the object) the electrolytic fluid moves around within the fluid-filled housing cavity and a majority of the fluid ions are swept from the excitation electrode toward one of the output electrodes. A positive output signal is generated from such an output electrode (via the amplifier and demodulator) in one direction of rotation and a negative output signal generated for the opposite direction of rotation. Neutralization of the ions in the moving fluid occurs at a ground electrode so that no effect on the opposite output can occur. Other than the electrolytic fluid, the accelerometer advantageously has essentially no movable parts.

Such a sensing device is particularly effective for oil well tool rotation sensing, angular acceleration sensing for six-axis accelerometers, robotics sensing, control system feedback, video game input, pedometers, inertial navigation and steering wheel motion sensing.

DETAILED DESCRIPTION OF THE INVENTION

Figure 1:
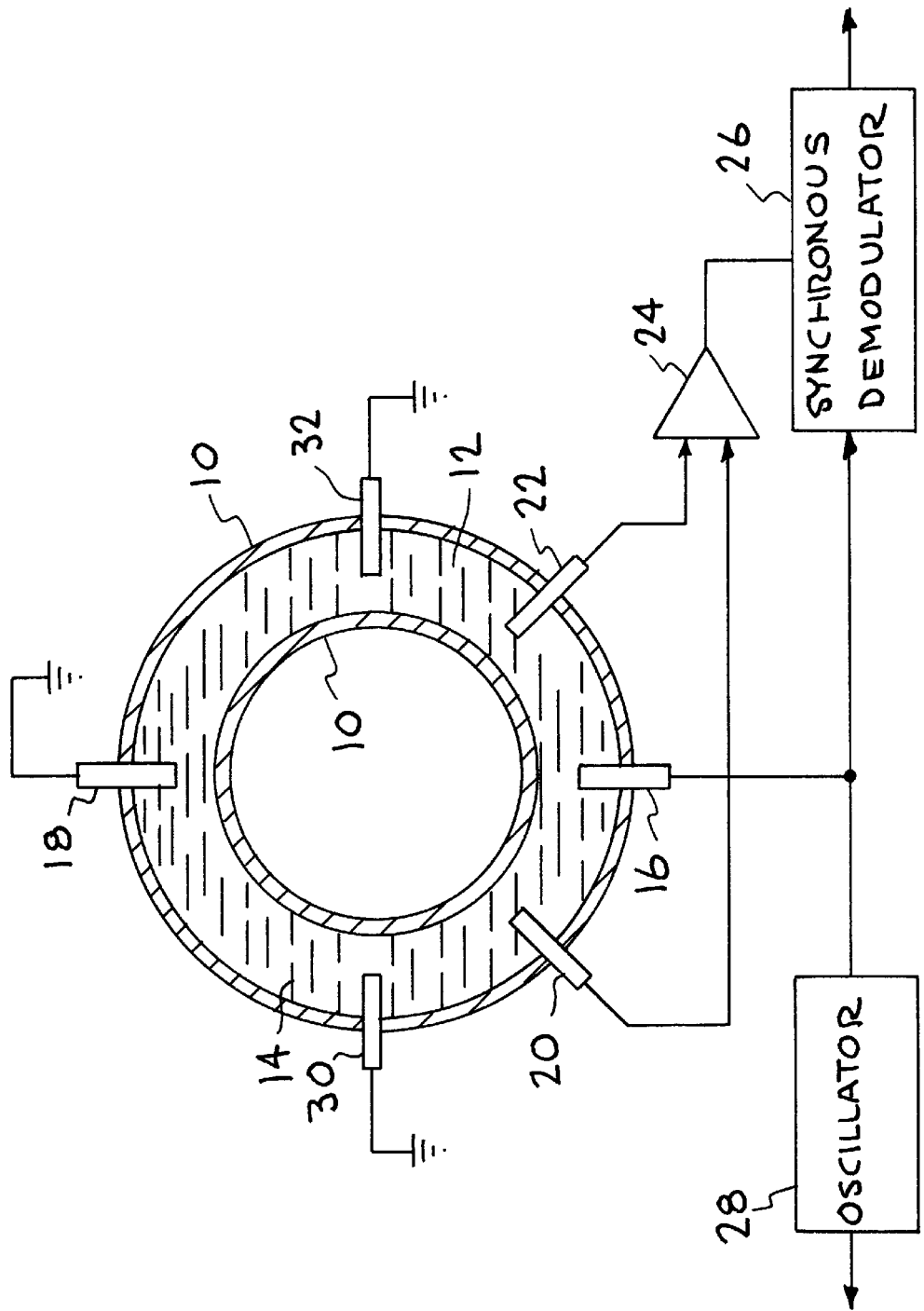
FIG. 1 represents a rotational rate sensor device including oscillation, amplification and synchronous demodulation schematic circuitry.

The invention includes a rate sensing device such as a toroid accelerometer that is illustrated in FIG. 1. The accelerometer includes a housing 10 having a fluid cavity 12 completely or essentially completely filled with an electrolytic fluid 14 (e.g., liquid). Within the housing and electrolytic fluid is disposed at least one excitation electrode 16 and at least one ground electrode 18 as well as at least one output electrode and preferably a pair of output electrodes shown as 20 and 22, respectively. Ordinarily the output electrodes 20 and 22 are externally connected (exterior to the cavity) to a differential amplifier 24 which is connected (also exteriorly) to a synchronous demodulator 26 or conventional means for averaging an amplified signal, as for example, a low pass filter or an RMS converter. In some synchronous demodulation systems the low pass filter is incorporated therein while in others the low pass filter follows the demodulator. An oscillator 28 can be externally connected to excitation electrode 16 and synchronous demodulator 26 or the averaging means.

The differential amplifier 24 can encompass such devices as a monolithic instrumentation amplifier or a combination of amplifiers that creates an output signal proportional to the difference of two inputs while substantially rejecting the voltage in common to the two inputs.

The synchronous demodulator 26 can encompass a circuit that chops the input signal at a rate controlled by a reference signal (in this case—the excitation signal). When the reference signal is positive, the output is the same as input signal, whereas when the reference signal is negative, the output is the input signal inverted. The resulting output is low pass filtered to give a low frequency signal that is proportional to the rotation rate. As in the present invention, synchronous demodulation is used with a continuous excitation signal since all frequencies other than the reference frequency are rejected. Such demodulation advantageously rejects noise.

During operation, the accelerometer is fixedly mounted to an object of rate measure (not shown) so that (upon movement of the object) the electrolytic fluid 14 moves around within the fluid-filled housing cavity and a majority of the fluid ions are swept from the excitation electrode 16 toward one of the output electrodes (e.g., output electrode 22). A positive output signal is generated from such an output electrode (via the amplifier and demodulator) in one direction of rotation and a negative output signal generated for the opposite direction of rotation (e.g., fluid ions swept toward output electrode 20). Neutralization of the ions in the moving fluid occurs at a ground electrode (e.g., ground electrode 18) so that no effect on the opposite output can occur. At least two ground electrodes are preferably employed, and when such ground electrodes 30 and 32 (shown alternatively to single ground electrode 18), have uniform spacing between the output electrodes, the four essentially equal resistors provide a full bridge (i.e., Wheatstone bridge). Alternatively, the ground electrode(s) disposed within the cavity can be of porous material, such as a mesh. Any and/or all the electrodes, although shown protruding within fluid cavity 12, can preferably be fabricated to be non-protruding, i.e., aligned essentially even with the walls of the cavity or housing (e.g., plated onto the walls) so that such electrodes are in the zero velocity laminar zone, rather than as wires extending into electrolytic fluid 14 where turbulence can be caused by fluid movement.

The porous ground electrode(s), such as the mesh type or equivalents, can simultaneously provide a damping effect within the cavity of electrolytic fluid and minimize any errant gas bubble trapped in the electrolytic liquid (such as by a device fabrication constraint). The degree of porosity or size of the mesh may be dependent on the surface tension of the electrolytic liquid. Although any necessary damping of the electrolytic liquid may be effected by skin friction within the housing and cavity, the extent of supplemental damping means within the cavity normally depends upon whether relatively fast or slow rate measurements are desired. When slow movements of the electrolytic fluid are to be measured, low damping and relatively high sensitivity can be adapted to the device. Alternatively, measurement of relatively fast movements can require higher damping means, but can provide lower sensitivity.

Other than the electrolytic fluid, the accelerometer advantageously has essentially no movable parts. The electrolytic fluid housed in the defined cavity is normally a conductive liquid which is non-aggressive (i.e., non-corrosive) to materials which comprise the components of the device, particularly the electrode materials and the housing materials. The impedance (e.g., resistance) of the electrolytic fluid (solution) must remain stable in order for the output voltage to remain accurately correlated to the angular movement (e.g., rotation). Although calibration of the device can be temperature sensitive due to different fluid viscosities, an advantage of the invention is the minimal movement of parts and minimal electrochemical reaction within the fluid cavity between electrolyte and electrode. Examples of electrolytes include ester-based electrolyte and/or other known alcohol/water electrolytes. The electrodes can be fabricated from precious or non-precious metals and alloys, although any conductive material is suitable including carbon and carbon aerogels. The housing materials include glass, ceramic, plastics, moldable polymeric materials, and any other conventional material.

Figure 2:
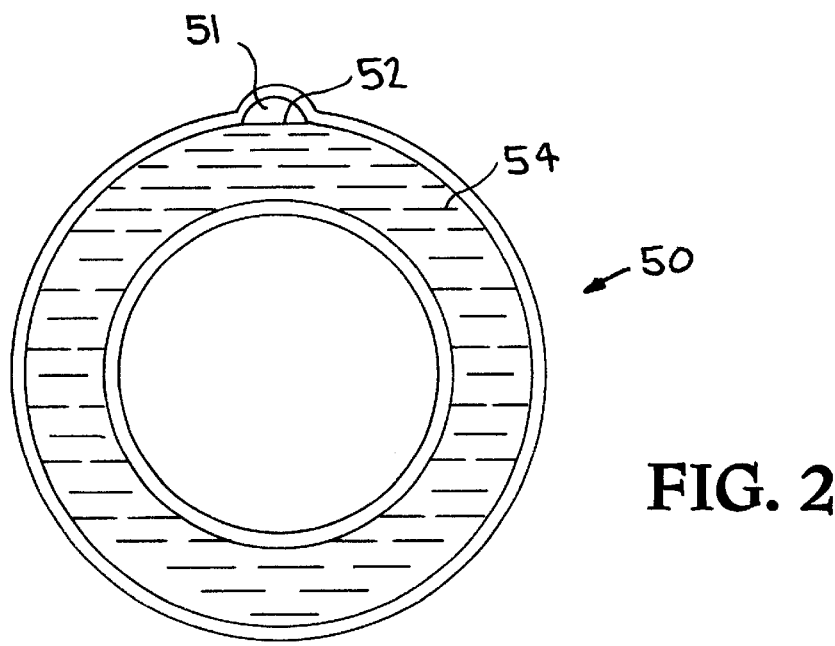
FIG. 2 represents an alternative rotational rate sensor device having an extension containing a gas bubble.

In the essence of the invention, the electrolytic fluid sufficiently fills the fluid cavity defined by the housing so that all of the electrodes remain in contact (and submerged) with the fluid during something less than a 360 degree rotation of the housing. Of course, when the electrolytic fluid essentially fills the fluid cavity such contact clearly present over any degree of rotation. In any event, the ions in the electrolytic fluid must be swept toward an output electrode from the excitation electrode. FIG. 2 illustrates an alternative embodiment of the invention wherein a relatively small cavity extending from the primary body of the fluid cavity defined by the housing may contain a different fluid than the electrolytic solution. Such an extension, i.e., a "nipple," can be formed during fabrication of the device, particularly during sealing of the electrolytic fluid in the housing. The result can be, for example, a gas bubble in the nipple along with the electrolytic solution housed in the majority of the fluid cavity (typically over 95 percent of the fluid cavity). In the case of the torroidal accelerometer, shown generally in FIG. 2 as 50, a gas (air) bubble 51 above the electrolytic solution level 52 of the electrolytic solution 54 results in the nipple after fabrication of the housing. Angles up to about 330 degrees could be achieved during rotation of the torroidal housing without losing or breaking contact between the electrolytic solution and the electrodes (ground, output and excitation), shown generally as 56. The electrodes should be uniformly spaced and disposed within the fluid cavity such that any angle of rotation will ensure contact between electrodes and fluid for measurement of the desired rotational rates. The extension or nipple embodiment is highly advantageous for ease of fabrication of the electrolytic fluid within the house during manufacture.

Another feature of the invention relates to the sensitivity of the rotational rate device. Although the device—without grounding—provides a significant oscilloscopic signal upon rapid movement of the ions in the electrolytic fluid through, for example, a 90 degree rotation about an axis of an object of measure, grounding the device provides a substantial difference in sensitivity and reduction in noise. With grounding, even a slow change of rotation exhibits a significant rotation effect that still returns to essentially zero.

Figure 3:
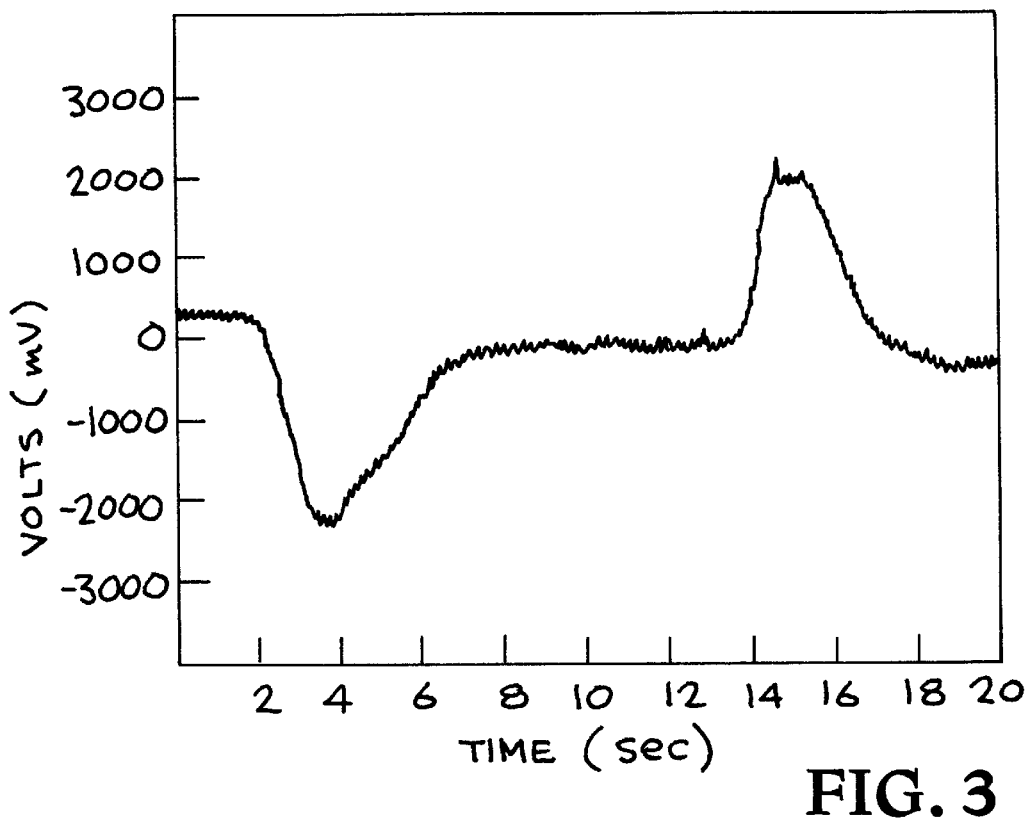
FIG. 3 illustrates an oscilloscopic waveform obtained from both a clockwise and counterclockwise rotational rate effect measured from a rotational rate sensor device of the invention.

FIG. 3 illustrates an oscilloscopic waveform signal (from a Tektronix THS710 digital storage scope) exhibiting a clockwise rotational effect, a return to zero, and a counter-clockwise rotational. Over a representative 20 second interval, the voltage spikes have a range of about plus or minus 2,300 mv. Furthermore the excitation frequencies involved during operation of the devices of the invention usually range from about 10 Hz to about 10 KHz, and normally from about 1 KHz to about 3KHz.

Typically mounted to an object of measurement, the sensing device of the invention is particularly effective for oil well tool rotation sensing, angular acceleration sensing for six-axis accelerometers, robotics sensing, control system feedback, video game input, pedometers, inertial navigation and steering wheel motion sensing.

Changes and modifications in the specifically described embodiments can be carried out without departing from the scope of the invention which is intended to be limited only by the scope of the claims.

What is claimed is:

1. An accelerometer comprising:
    a housing defining a fluid cavity;
    at least one excitation electrode disposed within said housing;
    at least one output electrode disposed within said housing;
    at least one ground electrode disposed within said housing; and
    an electrolytic fluid essentially filling said fluid cavity.

2. The accelerometer defined in claim 1 further comprising at least a pair of said output electrodes connected to a differential amplifier.

3. The accelerometer defined in claim 2 wherein said differential amplifier is connected to a synchronous demodulator or means for averaging a signal from said differential amplifier.

4. The accelerometer defined in claim 1 wherein said housing is a toroid.

5. The accelerometer defined in claim 1 further comprising at least two ground electrodes disposed within said housing.

6. The accelerometer defined in claim 1 further comprising at least a pair of said output electrodes wherein said output electrodes and said ground electrode and said excitation electrode are electrically connected to a measuring circuit.

7. The accelerometer defined in claim 6 wherein said measuring circuit comprises a Wheatstone bridge.

8. A sensing device for measuring angular rates about an axis, said device comprising:
    a housing defining a fluid cavity, said housing comprising at least one excitation electrode, at least two output electrodes, and at least two ground electrodes;

an electrolytic fluid essentially filling said cavity; and a measuring circuit wherein said output electrodes are connected to at least one differential amplifier and said differential amplifier is connected to a synchronous demodulator.

9. The device defined in claim 8 wherein said angular rates comprise rotational rates and said housing comprises a toroid.

10. The device defined in claim 9 wherein said output electrodes and/or said excitation electrode and/or said ground electrodes are essentially evenly aligned with a wall of said cavity.

11. The device defined in claim 8 wherein said differential amplifier comprises a monolithic instrumentation amplifier or a combination of amplifiers that creates an output signal proportional to the difference of two signal inputs while substantially rejecting the voltage in common to said two inputs.

12. The device defined in claim 8 wherein said synchronous demodulator comprises a circuit that chops an input signal at a rate controlled by a signal from said excitation electrode.

13. The device defined in claim 8 wherein said excitation electrode is connected to an oscillator and to said synchronous demodulator.

14. The device defined in claim 8 wherein said excitation electrode and said output electrodes are uniformly spaced within said cavity and said output electrodes and said ground electrodes are uniformly spaced within said cavity.

15. The device defined in claim 14 said excitation electrode and said output electrodes and said ground electrodes are electrically connected to a measuring circuit and wherein said measuring circuit comprises a Wheatstone Bridge.

16. The device defined in claim 8 wherein said excitation electrode adapted for excitation frequencies in the range from about 10 Hz to about 10 KHz.

17. The device defined in claim 8 wherein said synchronous demodulator is connected to a low pass filter.

18. A rotational rate sensor comprising:

a housing defining a fluid cavity;

at least one excitation electrode disposed within said housing and at least one output electrode disposed within said housing;

at least one ground electrode disposed within said housing; and an electrolytic fluid sufficiently filling said fluid cavity so that all of said electrodes remain in contact with said fluid during less than about a 330 degree rotation of said housing.

19. The rotational rate sensor defined in claim 18 further comprising at least a pair of said output electrodes connected to a differential amplifier.

20. The rotational rate sensor defined in claim 19 wherein said differential amplifier is connected to a synchronous demodulator.

21. The rotational rate sensor defined in claim 20 wherein said housing is a toroid.

22. The rotational rate sensor defined in claim 21 further comprising at least two ground electrodes and at least two output electrodes disposed within said housing.

23. The rotational rate sensor defined in claim 22 wherein said excitation electrode and said output electrodes and said ground electrodes are electrically connected to a measuring circuit comprising a Wheatstone Bridge.

24. The accelerometer defined in claim 1 wherein said ground electrode comprising a porous material disposed within said housing.

25. The rotational rate sensor defined in claim 19 wherein said differential amplifier is connected to means for averaging an amplified signal.

26. The rotational rate sensor defined in claim 25 wherein said means for averaging an amplified signal comprises synchronous demodulation and/or a low pass filter, or a RMS converter.

27. A method for sensing the rotational rate of an object about an axis, said method comprising:

mounting a rotational sensor to an object having at least one axis of rotation, said sensor comprising at least one excitation electrode, at least one output electrode, at least one ground electrode and an electrolytic fluid sufficiently filled in a fluid cavity to allow all of said electrodes to remain in contact with said fluid during less than about a 330 degree rotation of a housing containing said cavity;

allowing rotational movement of said object about said axis;

allowing movement of ions contained in said electrolytic fluid within said cavity in response to said rotational movement of said object; and measuring said movement of ions from said excitation electrode toward at least one of said output electrodes to create a signal representing at least some degree of rotation of said object.

* * * * *